United States Patent
Watson et al.

(10) Patent No.: US 9,503,579 B2
(45) Date of Patent: Nov. 22, 2016

(54) IDENTIFICATION OF NON-COMPLIANT INTERACTIONS

(71) Applicant: Verint Systems Ltd., Herzilya Pituach (IL)

(72) Inventors: Joseph Watson, Alpharetta, GA (US); Christopher J. Jeffs, Roswell, GA (US); Oren Stern, Alpharetta, GA (US); Galia Zacay, ganei-Tikva (IL); Omer Ziv, Ramat Gan (IL)

(73) Assignee: VERINT SYSTEMS LTD., Herzilya Pituach (IL)

( * ) Notice: Subject to any disclaimer, the term of this patent is extended or adjusted under 35 U.S.C. 154(b) by 0 days.

(21) Appl. No.: 14/158,363

(22) Filed: Jan. 17, 2014

(65) Prior Publication Data
US 2014/0241519 A1   Aug. 28, 2014

(51) Int. Cl.
*H04M 3/51* (2006.01)
*G06Q 10/06* (2012.01)

(52) U.S. Cl.
CPC ....... *H04M 3/5175* (2013.01); *G06Q 10/0631* (2013.01); *H04M 3/5133* (2013.01)

(58) Field of Classification Search
CPC .......... H04M 3/5166; H04M 3/5175; H04M 3/5133; G06Q 10/0631
USPC ............... 379/265.06, 265.07; 704/235, 270, 704/270.1
See application file for complete search history.

(56) References Cited

U.S. PATENT DOCUMENTS

| | | | |
|---|---|---|---|
| 7,191,133 B1* | 3/2007 | Pettay | 704/270 |
| 2005/0010411 A1* | 1/2005 | Rigazio et al. | 704/246 |
| 2007/0154006 A1* | 7/2007 | Onodera et al. | 379/265.01 |
| 2010/0104087 A1* | 4/2010 | Byrd et al. | 379/265.09 |
| 2012/0254243 A1* | 10/2012 | Zeppenfeld | H04M 15/47 707/778 |
| 2014/0074467 A1* | 3/2014 | Ziv et al. | 704/235 |
| 2014/0142940 A1* | 5/2014 | Ziv et al. | 704/235 |

* cited by examiner

*Primary Examiner* — Harry S Hong
(74) *Attorney, Agent, or Firm* — Meunier Carlin & Curfman

(57) ABSTRACT

A method of evaluating scripts in an interpersonal communication includes monitoring a customer service interaction. At least one portion of a script is identified. At least one script requirement is determined. A determination is made whether the at least one portion of the script meets the at least one script requirement. An alert is generated indicative of a non-compliant script.

18 Claims, 3 Drawing Sheets

IDENTIFICATION OF NON-COMPLIANT INTERACTIONS

CROSS-REFERENCE TO RELATED APPLICATION

The present application claims priority of U.S. Provisional Patent Application No. 61/753,641, filed on Jan. 17, 2013, the content of which is hereby incorporated herein by reference in its entirety.

BACKGROUND

The present disclosure is related to the field of communication analytics, more specifically, the present disclosure is related o the identification of no-compliant communication interactions.

Many customer service interactions are driven by predefined scenarios and static rules that are triggered by actions or events that take place during a customer service interaction. These predefined scenarios may be presented in the form of scripts that have been created to convey particular information to the customer participating in the interaction. These scripts may be delivered by the customer service agent participating in the interaction, or may be automatedly delivered to the customer by playing a recording. Scripts can be implemented for internal best practices and quality control of a larger number of customer service interactions across multiple customer service agents. Other scripts may be designed in order to comply with external regulatory, legal, or other such requirements.

While the creation and implementation of scripts used in customer service interactions facilitate the goals of consistently providing effective and/or necessary information to customers in a manner determined to be a best practice, such implementation is only effective if the customer service agents incorporate the proper scripts in the appropriate scenario or in response to the appropriate triggering of events. Furthermore, the customer service agent must follow the script closely enough such that the purpose of the script, whether informative or otherwise, is achieved.

Therefore, in embodiments as disclosed herein, speech analytics of a customer service interaction are analyzed to identify customer service interactions in which a script or other standard message vas either incorrectly delivered, inappropriately delivered, or absent from a customer service interaction.

BRIEF DISCLOSURE

An exemplary embodiment of a method of evaluating scripts in an interpersonal communication includes monitoring a customer service interaction. At least one portion of a script is identified in the customer service interaction. At least one script requirement is determined from the customer service interaction. A determination is made if the identified at least one portion of a script meet the at least one script requirement. An alert is generated if the identified at least one portion of the script does not meet the at least one script requirement.

An exemplary embodiment of a system for evaluating scripts in an interpersonal communication between a customer service agent and a customer includes a source of customer interaction content. The customer interaction content includes customer service interaction data. A database includes a plurality of scripts. A processor is communicatively connected to the source of customer interaction content and the database that includes a plurality of scripts. The processor receives customer service interaction data and processes the customer service interaction data with the plurality of scripts to identify at least one script portion in the customer service interaction data. The processor further processes the customer interaction content to identify at least one script requirement based upon the customer interaction content. The processor compares the identified at least one script portion to the identified at least one script requirement to evaluate a non-compliance of the identified at least one script requirement. The processor produces an alert if a non-compliance is determined. A graphical display is communicatively connected to the processor. The graphical display operates to visually present the alert.

An exemplary embodiment of a non-transient computer readable medium programmed with computer readable code, that when executed by a computer processor causes the processor to perform actions, includes causing the processor monitor a customer service interaction. The processor further receives audio data of the customer service interaction. The processor transcribes the audio data of the customer service interaction to produce an interaction transcript. The processor identifies at least one portion of a script in the interaction transcript. The processor determines at least one script requirement from the monitored customer service interaction. The processor determines if the identified at least one portion of the script meets the at least one script requirement. The processor generates an alert indicative of a non-compliant customer service interaction if the at least one portion of the script does not meet the at least one script requirement.

DETAILED DISCLOSURE

Figure 1:
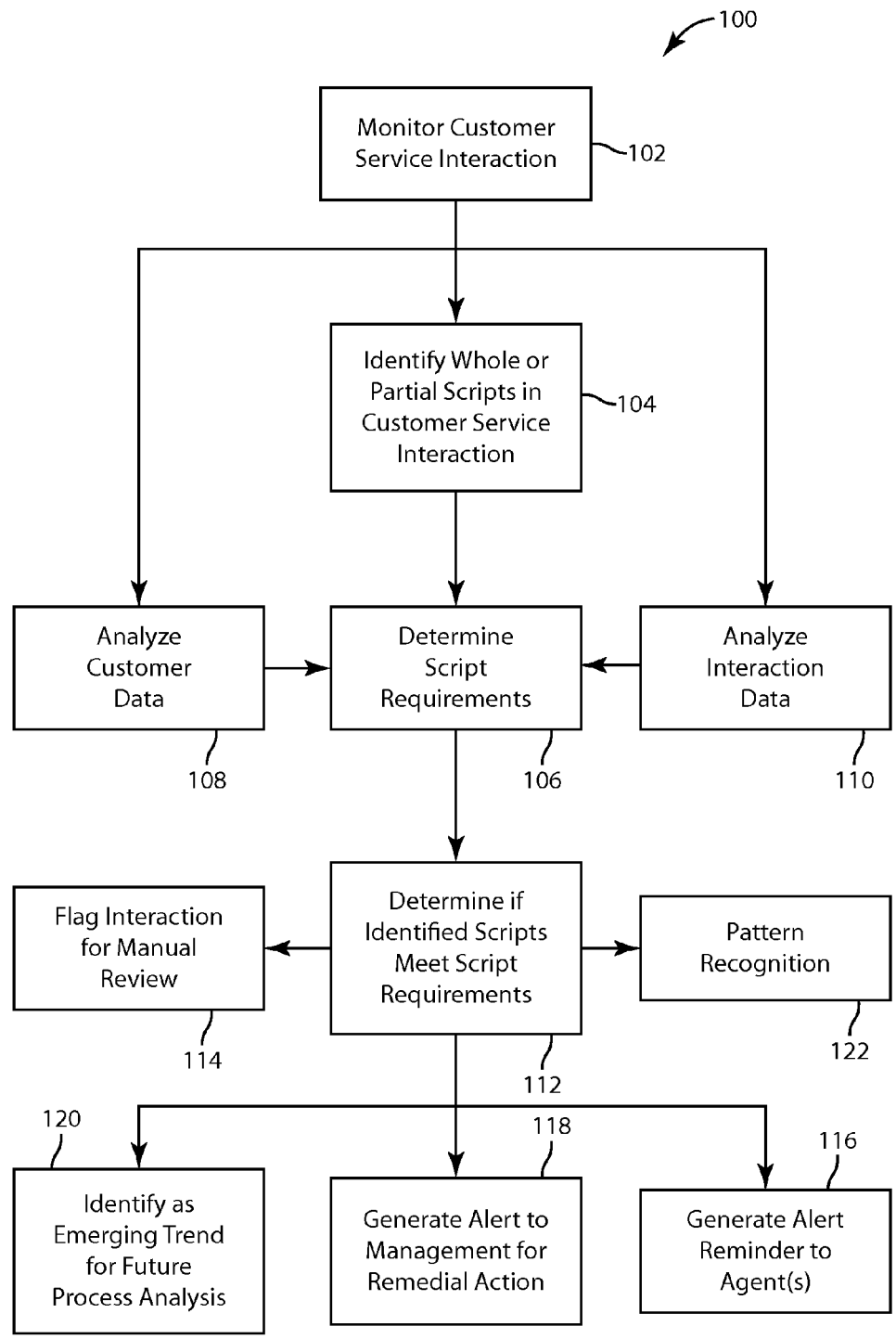
FIG. 1 is a flow chart that depicts an embodiment of a method of identifying non-compliant interactions.

FIG. 1 is a flow chart that depicts an exemplary embodiment of a method 100 of identifying non-compliant interactions. For exemplary purposes, an embodiment of a customer service interaction is used; however, it is to be understood that embodiments need not be so limited and may be implemented with other forms of communication interactions. In embodiments of the method a communication is monitored and analyzed to determine if expected scripts or events occurred. This determination results in an identification if a communication is complaint or non-compliant with expectations or requirements. Alternative or remedial action may be taken in response to an identified non-complaint interaction.

Figure 2:
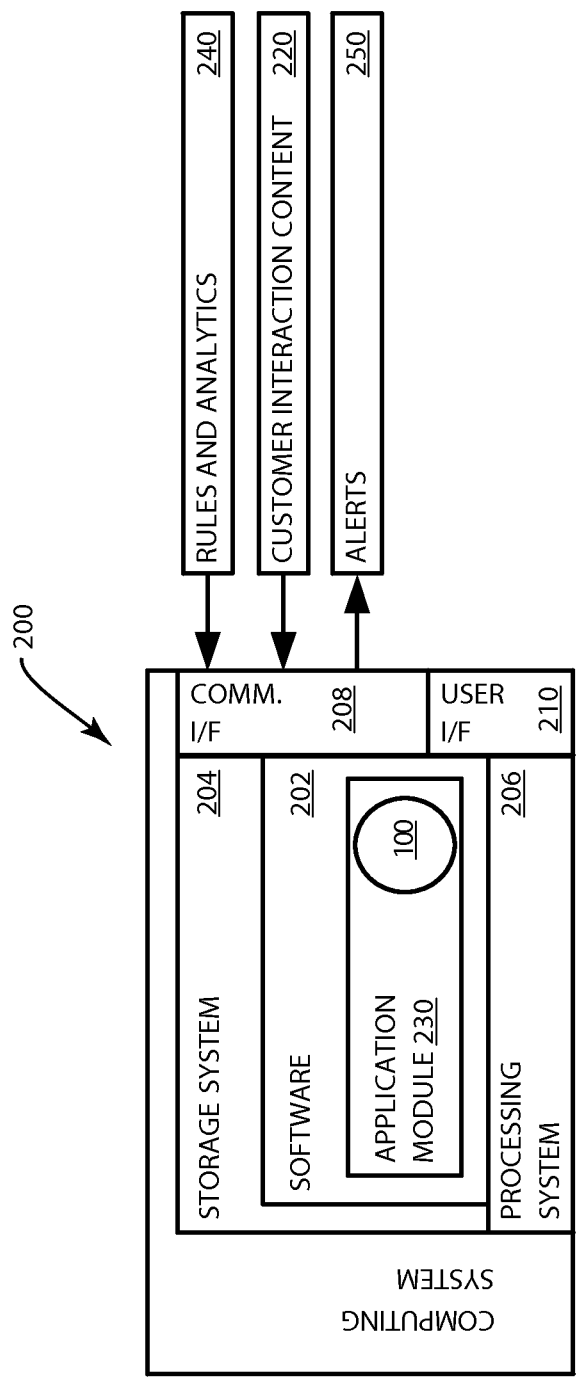
FIG. 2 is a system diagram of an exemplary embodiment of a system for identifying non-compliant interactions.

FIG. 2 is a system diagram of an exemplary embodiment of a system 200 which may be used to automatedly design, deliver, and analyze customer feedback surveys in the manner described herein with respect to the embodiment of the method 100 depicted in FIG. 1. The system 200 is generally a computing system that includes a processing system 206, storage system 204, software 202, communication interface 208, and a user interface 210. The processing system 206 loads and executes software 202 from the storage system 204, including a software module 230. When executed by the computing system 200, software module 230 directs the processing system 206 to operate as described herein in further detail in accordance with the method 100.

Although the computing system 200 as depicted in FIG. 2 includes one software module in the present example, it should be understood that one or more modules could provide the same operation. Similarly, while a description as provided herein refers to a computing system 200 and a processing system 206, it is to be recognized that implementations of such systems can be performed using one or more processors, which may be communicatively connected, and such implementations are considered to be within the scope of the description.

The processing system 206 can comprise as microprocessor and other circuitry that retrieves and executes software 202 from storage system 204. Processing system 206 can be implemented within a single processing device but can also be distributed across multiple processing devices or sub-systems that cooperate in executing program instructions. Examples of processing system 206 include general purpose central processing units, application specific processors, and logic devices, as well as any other type of processing device, combinations of processing devices, or variations thereof.

The storage system 204 can include any storage media readable by a processing system 206, and capable of storing software 202. The storage system 204 can include volatile and non-volatile, removable and non-removable media implemented in any method or technology for storage of information, such as computer readable instructions, data structures, program modules, or other data. Storage system 204 can be implemented as a single storage device but may also be implemented across multiple storage devices or sub-systems. Storage system 204 can further include additional elements, such as a controller, capable of communicating with the processing system 206.

Examples of storage media include random access memory, read-only memory, magnetic discs, optical discs, flash memory disks, virtual and non-virtual memory, magnetic sets, magnetic tape, magnetic disc storage or other magnetic storage devices, or any other medium which can be used to store the desired information and that may be accessed by an instruction execution system, as well as any combination of variation thereof, or any other type of storage media. In some implementations, the storage media can be a non-transitory storage media.

User interface 210 can include a mouse, a keyboard, a voice input device, a touch input device for receiving a gesture from a user, a motion input device for detecting non-touch gestures and other motions by a user, and other comparable input devices and associated processing elements capable of receiving user input from a user. Output devices such as a video display or a graphical display can display an interface further associated with embodiments of the system and method as disclosed herein. Exemplarily, these output devices operate to present alerts, reminders, or guidance as disclosed herein. Speakers, printers, haptic devices, and other types of output devices may also be included in the user interface 210.

As described in further detail herein, the computing system 200 receives customer interaction content 220. The customer interaction content 220 is exemplarily provided from a source such as an audio recording system or a transcription system (not depicted). Exemplarily the customer interaction content 220 may include one or more audio files which may be audio recordings of a customer service interactions, which may exemplarily be between two speakers, although the audio recording may be of any other variety of other audio records, including multiple speakers, a single speaker, or an automated or recorded auditory message. In an embodiment as disclosed herein, the processor 200 may operate to transform the received customer interaction content 220 into a text form. In other embodiments, the computing system 200 may receive the customer interaction content 220 as one or more text files, exemplarily in an embodiment wherein a monitored customer service interaction has already been transcribed. As described in further detail herein, the customer interaction content 220 can include other firms of data and types of information that includes other monitored activity that occurs before, during, or after a customer service interaction as described in further detail herein.

While various rules, algorithms, or analytics modules as used in embodiments as disclosed herein may be stored on the storage system 204, exemplarily as part of the software 202 or application module 230. In additional embodiments, the computing system 200 may receive additional rules and/or analytics 240 from other sources external to the computing system 200. In embodiments, scripts or script models as used and described in further detail herein may exemplarily be stored on the storage system 204 or may be stored remotely and provided to the computing system 200 at 240.

In embodiments as disclosed in further detail herein, the computing system executes the application module 230 to carry out an embodiment of the method 100. In such embodiments the computing system 200 processes and analyzes the customer interaction content 220 in order to identify instances of customer service interactions that are not compliant with previously defined expectations, requirement, or standards, and produces alerts 250 upon identification of such non-complaint interactions.

At 102 a customer service interaction is monitored. In an embodiment, the customer service interaction is a call between a call or customer with a customer service agent. The monitoring of the customer service interaction results in customer service interaction content. In embodiments, the customer service interaction is digitized as an audio file which is either recorded or streamed for real-time analysis, or both streamed and recorded for later analysis. While the present disclosure is generally with respect to an embodiment of an audio recording of a customer service interaction, it is to be understood that similar techniques may be used in connection with a video recording, a component of which may be an audio file.

Various techniques may be used to monitor a customer service interaction, and it will be recognized that in some embodiments, the customer service interaction is monitored in real-time, such as through the analysis of streaming audio data, while in other embodiments, the customer service interaction may be recorded and then monitored after the customer service interaction has taken place. Both techniques present advantages and/or disadvantages. Namely, the intra-interaction analysis of streaming audio data restricts the algorithms and techniques available tear analysis of the data, but provides the opportunity for a remedial reminder or prompt to the customer service agent in order to take corrective action if non-compliance is detected. On the other hand, post-interaction analysis of recorded audio data enables the use and allocation of a wider variety of analysis algorithms and/or techniques.

In general, speech analytics of audio data divides the audio data into identifiable and analyzable segments and then seeks to extract meaning, content, or sentiment from segments and then seeks to extract meaning, content, or sentiment from the segments. Two ways in which audio data can be processed for speech analytics include transcription and diarization. In transcription, the audio file is converted into a text file. In diarization, the audio file is separated by speaker in the customer service interaction, such that the content of the parties to the customer service interaction can be analyzed separately. The customer interaction content can further include details regarding the customer service interaction captured and monitored in conjunction with the audio data. These interaction details may include other monitored activity that occurs before, during, or after the audio portion of the customer service interaction and may include, but are not limited to agent desktop activity, customer or order information accessed or entered before, during, or after the call, survey data collected during or as a result of the customer service interaction, and emails, text messages, or orders sent before, during, or after the call. Other speech analytics may be applied to the audio data in view of the identified interaction details in order to identify spoken terms or phrases, topics of conversation, customer sentiment, or other analysis of the customer service interaction. In still further embodiments, these forms of customer interaction content can be used to identify or select the script requirements used for analysis as described in further detail herein.

After the customer service interaction has been transcribed and diarized, other speech analytics may be applied. That information can be used at 104 in order to identify whole or partial scripts spoken by the customer service agent in the customer service interaction. The identification of whole or partial scripts may compare a database of script text to the transcript of the agent side of the customer service interaction. In embodiments, scripts may be as short as a few words, e.g. "sir" "apologize", "account number", "let me transfer you", "what I'll do is", "let me see if", or others (to longer phrases or entire paragraphs of scripted content, e.g. " . . . customer services this is [name] speaking, how can I help you . . . "). Due to the linguistic properties of the conversation, it is rare to find a relatively long (e.g. five or more, seven or more, ten or more) stretches of words contained within the agent side transcript of a customer service interaction that corresponds to a script, when no script was intended by the customer service agent.

One challenge is to identify scripts when minor variations from the script are present in the agent's transcript, such script deviations may result from agent reading errors, pronunciation, transcription errors, or non-compliance with script requirements. Therefore, at 104 the identification of whole or partial scripts in the agent transcript of the customer service interaction may be done using a similarity score between the text found in the transcript versus the idealized scripts to be used by the customer service agent. Such a similarity score may measure the preciseness between the identified scripts or script portions and portions of the agent transcript. While such a similarity score may serve to evaluate the accuracy with which the script was followed or that a script was properly identified by the system, a higher similarity score may also indicate a higher likelihood that a script was in fact recited by the agent, rather than a random occurrence of similar language organically occurring during the customer service interaction.

Figure 3:
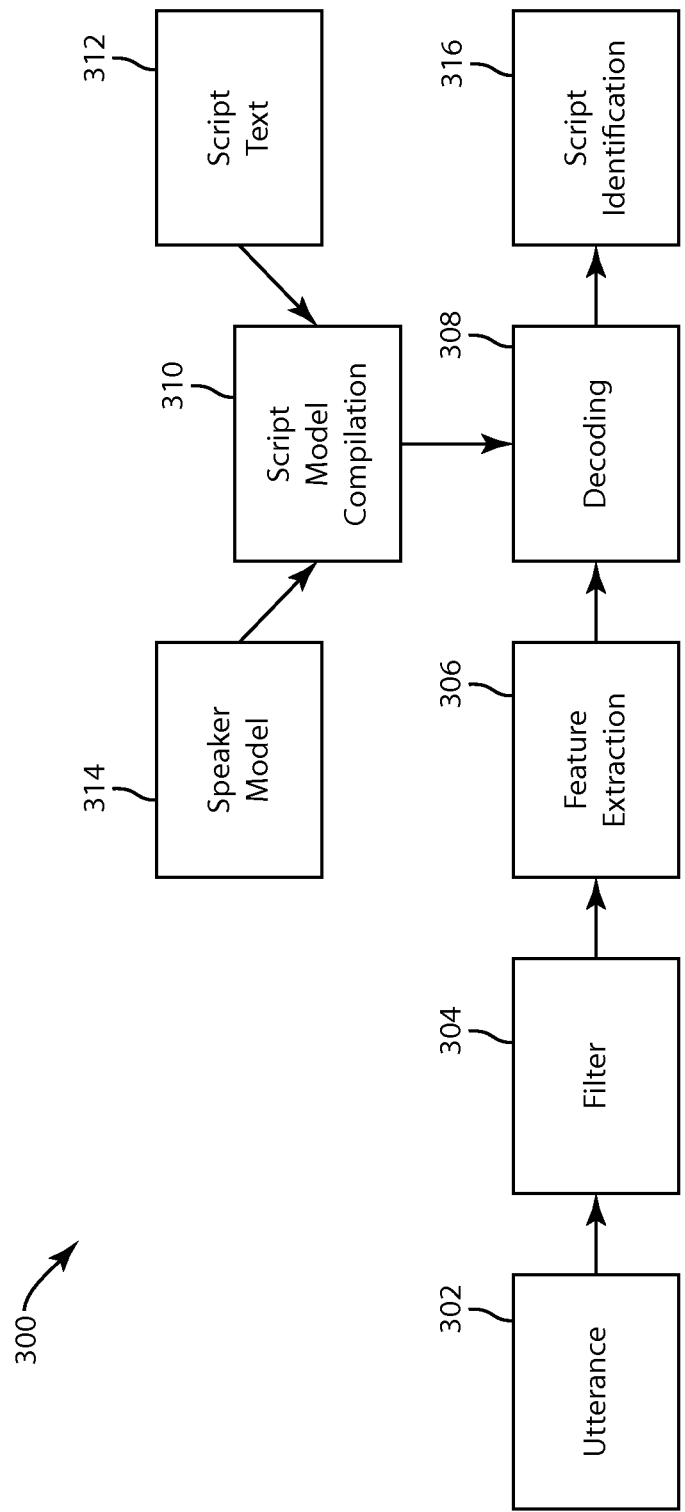
FIG. 3 is a flow chart that depicts an exemplary embodiment of a method of script identification.

FIG. 3 is a flowchart that depicts a merely exemplary embodiment of a method 300 by which scripts may be identified in accordance with the methods disclosed herein. It is to be understood that this is merely exemplary and not intended to be limiting on the manners by which scripts may be identified in embodiments within this disclosure. The method 300 receives audio data, exemplarily in the form of to streaming mono .WAV file. In an embodiment, the script identification is performed in real-time while in other embodiments, the script identification is performed on previously recorded audio data. In an embodiment, the audio data undergoes voice activity detection in order to segment the audio data into a plurality of utterances 302. The utterances 302 are exemplarily segments of the audio data that are likely to be speech separated by segments that are likely to be non-speech.

In an embodiment, at 304, the utterances at 302 may be optionally filtered in order to focus the script analysis to a subset of the utterances which are likely to include the script or be of particular interest for the script to be identified. In exemplary embodiments, such filtering at 304 may filter the utterances at 302 such that only utterances attributed to the customer service agent are processed. In another embodiment, the utterances are filtered such that only utterances from a particular time range are processed for script detection, while in a still further exemplary embodiment, the utterances are filtered to only process those utterances that have already been identified, potentially by another system, or by a manual input by a manger as potentially including a script.

At 306 features are extracted either from the full set of utterances 302 or a filtered and reduced set of utterances from 304. In acoustic feature extraction at 306, one or more acoustic features are identified for each of the utterances. In a merely exemplary embodiment, the extracted acoustic features are Mel-frequency cepstrum coefficients (MFCCs). The MFCC are a type of cepstral representation of the utterance. Therefore the MFCCs are specific representations of the spectrum of the utterance and can be used to model a spectral envelope of the utterance. The MFCCs or other extracted acoustic features can help to distinguish between speakers and can also help to distinguish phonemes in the utterance.

Next, at 308, the segmented utterances and extracted features undergo a decoding process to identify scripts in the utterances. The decoding at 308 applies a script model compilation 310 to the utterances. In a non-limiting embodiment, the decoding may be performed using the Viterbi algorithm to apply the one or more models to the audio data. The Viterbi algorithm is described in Viterbi A. J., "Error bounds for convolutional codes and an asymptotically optimum decoding algorithm". *IEEE Transactions on Information Theory* 13(2): 260-269 (1967), which is hereby incorporated by reference in its entirety.

A script model is compiled at 310 which may represent the words from a script text 112 as a grammar or a series of phonemes to be recognized in the audio data. The script text 112 may exemplarily include variation or variability such as to incorporate or acknowledge common, but tolerated varieties in script delivery.

In some embodiments, the script model compiled at 310 may further be compiled with one or more speaker models 314 that are specific to the customer service agent in the audio data. Specifically, in an exemplary embodiment such as a customer service call center, audio data for a specific customer service agent can be repeatedly captured and analyzed in order to create an acoustic model representative of or tailored to a specific customer service agent. If the customer service agent is known, then this specifically tailored speaker model at 314 may be incorporated into the script model compiled at 310. This incorporation of additional information surrounding the agent or person who is likely to be speaking the scripts can further refine the detection of scripts increasing accuracy of the method 300 as disclosed herein.

In one embodiment, the decoding from 308 produces an output indicative of a script identification at 316. In an embodiment, this is exemplarily a binary indication as to whether or not a particular script was identified in the analyzed audio data. In an embodiment, such identification indicates whether or not a script, melting one or more definition of script sufficiency or acceptable script accuracy occurred. In still other embodiments, an identification of a partial script or a script attempt may be made.

In a non-limiting embodiment, one or more of the scripts may be automated and presented in conjunction (e.g. before or after) the customer service interaction. In such embodiments as disclosed herein, the detected script may be an exact match and the analysis may focus more on whether the correct automated script was delivered.

Referring back to FIG. 1, at 106 script requirements are determined for the customer service interaction. In determining script requirements, defined business logic or algorithms are compared or applied to customer data or details of the customer service interaction in order to identify which scripts, if any, were required for the customer service interaction. Such requirements for scripts may be defined by institutionally defined best practices or instructions/training to customer service agents or such script requirements may be dictated in order to comply with regulatory or legal requirements. Various data from the customer service interaction content may be examined in determining the script requirements at 106.

At 108 customer data may be analyzed to assist in determining script requirements. In an exemplary embodiment, the speech analytics of the customer service interaction may identify the customer participating in the customer service interaction and the identification of such a customer (e.g. by a customer name or account number) is used to look up customer account information that may identify recent customer purchases, returns, or other transactions, including, but not limited to: service agreements, addition or cancellation of services, or registered customer complaints. Such information may lead to the determination that recent or historical activity of the customer requires that the customer service agent present certain information which may be embodied in a script that should detected in the transcript of the customer service interaction.

In addition to analyzing stored customer data at 108, historical customer interactions may be analyzed, including, but not limited to spoken terms or phrases, call categorization, or conversation topics of historical customer service interactions with the customer. Other customer details may be accessed based upon the customer identification, including, but not limited to, customer type, products, or service utilized by the customer, customer demographics, or customer location. Finally, speech analytics of other historical customer service interactions may be accessed if such historical customer service interactions, while not with the same customer, are identified to be similar or related to the customer service interaction currently being analyzed.

On the other hand, the current customer service interaction is analyzed at 110 in order to determine if the current customer service interaction triggered the need for the information to be conveyed to the customer through any particular scripts. The customer service interaction data analyzed at 110 may include information regarding the customer service interaction beyond the transcript of the interaction, and may include information including, but not limited to CTI information, call path or routing information, or agent queue information. The customer service interaction data may further leverage speech analytics applications in order to identify spoken terms or phrases within the customer service interaction, call categorization, or conversation topics. Other customer service interaction content, including desktop activity or desktop analytics, can be analyzed at 110 in order to identify applications, pages, or screens accessed by the agent in conducting the customer service interaction. Values entered into such applications or pages or patterns or flow of actions performed by the customer service agent may also be analyzed.

Once the customer data has been analyzed at 108 and the interaction data has been analyzed at 110, the script requirements for the customer service interaction can be determined at 106. As described above, the determination of script requirements is performed by applying defined business logic against any of the above-identified analyzed customer data or customer service interaction data to determine which scripts, if any, should have occurred during the customer service interaction. Such determined scripts may be selected from a database of scripts stored for reference. The defined business logic used in this determination may be a series of rules or algorithms that may include Boolean statements or relations between customer data and/or customer service interaction data. A non-limiting example of such a rule may be, "script X appears any time topic A is mentioned by the customer." Rules may also be phrased in the negative, such as, "script X does not appear any time that topic A is mentioned by the customer." In alternative embodiments, physiological or Bayesian logic may be used as the defined business logic. These rules can include details or data from one or more sources of information as described above and may result in the determination that a particular script is required to appear in the customer service interaction while another rule may determine that a particular script is required to be absent from the customer interaction. Still further applications of the defined business logic may apply complex rules in the exemplary form of if then statements wherein script requirements are predicated upon the performance or occurrence of precursor activities or conditions. A non-limiting example of such a rule may be, "script X appears if topics A or B are mentioned along with a recent order placed by the customer." The logic may further define positional rules regarding the order of presentation of a script or scripts or the ordinal relationship between scripts or messages. A non-limiting example of such a rule may be, "script X appears within two minutes of confirming a new order by the customer."

As disclosed above, the business logic may be implemented w more relational or score based implementations wherein the requirement for a particular script to occur is calculated based upon a confidence score that is related both to the determination of the script requirement, as well as to any underlying confidence scores in the underlying speech analytics, such as confidence in the transcription, diarization, script identification, or identification of particular words, events, or conversation topics. Such embodiments may include thresholds on confidence score or other speech analytics result in order to trigger the requirement for a script to be present in the customer service interaction.

In still further embodiments, historical customer service interactions may be analyzed through speech analytics or other pattern analysis techniques in order to detect common patterns, words, phrases, or conversation topics that are correlated with specific scripts and conditions that are present in historical customer service interactions when scripts are presented in those interactions. Such identified patterns may then be applied to the current customer service interaction as their own business logic rules in order to identify when particular scripts should occur. Embodiments of this feature will be described in further detail herein.

After the script requirements for the customer service interaction have been determined at 106, then the identified whole or partial scripts in the customer service interaction from 104 are compared to the determined script requirements from 106 in order to determine at 112 if the identified scripts meet the script requirements. Then, due to differences in the actual presentation of the script by a customer service agent, or transcription errors, the comparison between the identified whole or partial scripts and the script requirements may be performed on a confidence score basis wherein the determination is made based upon a two part confidence score. The first part of the confidence score being based upon the confidence in the identification of the whole or partial script, while the second part of the confidence score is based upon the determination that the identified script meets the script requirements. A variety of outputs or responses can occur in response to the determination that a script requirement was not met by the customer service interaction.

One response may be that the customer service interaction is flagged for a manual review at 114. With this action, the customer service interaction may be sent to a manager or other quality control personnel for a manual or in-person review and/or confirmation of the customer service interaction in order to determine whether or not required scripts were in fact delivered to the customer. Such a flag for a manual review may be based upon a confidence score threshold defined as part of the business logic. In an exemplary embodiment, all interactions with a score over a predetermined threshold are automatically accepted, while all other customer service interactions with scores below the threshold require manual review. In an alternative non-limiting embodiment, interactions with a score above a first threshold are accepted while interactions with a score below a second threshold are identified as non-compliant, while interactions with scores of ambiguous or indeterminate nature such as between the first and second thresholds are flagged for manual review. The flagging of the customer service interaction for manual review at 114 may also be based upon another business logic or rule, for example, a business determination may be made that all of a particular type of customer service interaction will undergo manual review for script compliance or that particular scripts, such as legal or regulatory nature are of such importance that all customer service interactions requiring such scripts are flagged for manual review.

In a non-limiting example of the above disclosure, an organization may be relatively confident in the process used to identify non-compliant scripts and if the confidence score is above a threshold, such as a percent, that confidence is sufficient and those customer error actions are passed as being compliant. However, if a confidence score is in an exemplary range of 55-79%, the customer service interactions are flagged for a manual review to confirm or deny whether the interaction was compliant. Anything below 50% may exemplarily be flagged as non-compliant. In a related alternative embodiment, which is in a highly regulated industry, e.g. a public utility where the utility may penalties or fines if proper customer disclosures are not provided, then the system may be more stringent where everything about a threshold e.g. 80% confidence or 90% confidence is passed as being compliant, while everything below that threshold is flagged for manual review to determine compliance and to take remedial action, such as is disclosed in further detail herein if the manual review determines that the customer service interaction was not compliant.

In alternative embodiments, the determination if identified scripts meet script requirements at 112 may result in a generation of an alert or a reminder to an agent or agents at 116. Such an alert may be generated in an event that it is determined at 112 that the customer service interaction is a non-compliant interaction due to failure to deliver a script or to improperly include a script. As mentioned above, in embodiments wherein the customer interaction is being monitored at 102 in real-time, the alert generated at 116 may be provided directly to the agent while the customer service interaction is still ongoing, such that the agent may take remedial steps during the customer service interaction in order to make the customer service interaction compliant with script requirements. In alternative embodiments wherein the customer service interaction is monitored after the customer service interaction has concluded, the alerts generated at 116 may be in the form of guidance or other reminders either specifically directed to the agent involved in the customer service interaction, or to all agents or a team of agents in order to remind agents of the script requirements. In a still further embodiment, the alert generated at 116 may be due to later identified customer data, such as customer data acquired through post-call processing, or a post-call survey response or an order, a return, or request for service placed by the customer within a short time of the customer service interaction that may trigger an alert to the agent or to other personnel to review the customer service interaction for script compliance.

In embodiments, the alert generated at 116 may be email, SMS, or pop-up messages on the screen of the agent's workstation. Or other alerts as may be recognized to convey reminders to agents about process or work flow steps.

At 118 if a customer service interaction is determined to be non-compliant with script requirements, an alert may be generated to management for remedial action. In particular embodiments for implementation for the methods as disclosed herein, scripts may be designed in order to comply with regulatory or legal requirements. Such regulatory or legal requirements may exist in the context of customer service interactions in the financial, utility, cellular phone, or cable subscription services; however, this list is not intended to be limiting on the scope of customer service fields in which regulatory or legal requirements may dictate customer service scripts. In some examples of such situations, a provider may be subject to sanction or fine if a customer is not provided with certain regulatory disclosure information and therefore, in the event that a non-compliant customer service interaction is identified, a management or quality control personnel must take a remedial action to address the script non-compliance. Non-limiting examples of such remedial action may be contacting a customer in order to provide the requisite disclosure, or notification of regulatory or legal authorities to report the non-compliance in an effort to show good faith and policing of customer disclosure requirements.

In still further embodiments, a non-compliant customer service interaction can be identified at 120 as an emerging trend that necessitates future process analysis and/or review of modification of customer service processes in order to address identified instances of script non-compliance. Non-limiting examples of such actions that may be taken after script non-compliance is identified as an energizing trend may be changes to the script itself or script requirements, performance monitoring of agents or customer service interactions, coaching, agent education, or other intra-interaction agent guidance.

In an alternative embodiment, the determination of the script compliance of a customer service interaction is provided at 122 for pattern recognition to the customer service interaction in order to automatedly and continuously monitor new customer service interactions in view of previously analyzed customer service interactions in order to detect common patterns associated with customer service interaction and the compliant provision of scripts or non-compliant provision of scripts to customers in further combination with other customer service interaction data or customer data. The pattern recognition at 122 may further identify patterns in the customer service interaction that result in greater compliance or non-compliance of script requirements, or may help to identify correlations between script compliance or non-compliance in relation to other similar service interaction data or customer data, including, but not limited to customer service quality feedback through surveys, or customer purchasing habits.

In a non-limiting embodiment, pattern recognition firmed at 122 can help to uncover patterns relative to non-compliant calls and the uses of scripts in customer service interaction. In some embodiments, as the patterns are uncovered, they may be presented to personnel to decide whether or not these patterns should be translated into rules or business logic for future use in determining script compliance. Alternatively, these patterns may be used in determining emerging issues in script compliance. Furthermore, general practices can emerge as patterns and by comparison of an individual customer service interaction to the identified script patterns can highlight that it particular customer service interaction, or maybe a particular customer service agent is not following the pattern, and thus is resulting in non-compliant script usage.

In embodiments, a company or a customer service center may have defined rules or in some cases governmental, legal, or regulatory mandates that require the presentation of a script to a caller when certain conditions apply or events occur in an associated customer service interaction. Failure to comply with these rules for presenting scripts can result in a significant impact to business or customer service and, in the event of regulatory and legal requirements, may result in monetary fines or penalties. The presently disclosed method provides a solution that automatically monitors and detects script compliance or non-compliance in customer service interactions by leveraging speech analytics of the customer service interaction. Furthermore, since rules for script compliance at not always based on basic customer information extracted from a customer file or explicitly extracted through speech analytics embodiments leverage complex information about the customer, customer history, and the current customer service interaction in order to make determinations on whether a call is in compliance or non-compliant with script requirements.

In still further embodiments, pattern recognition approaches are applied to the customer service interaction data in order to further identify patterns related to script compliance and script occurrences associated with customer or interaction data. This analysis may be used prospectively to automatedly identify other calls that fit detected script patterns, but do not result in an occurrence of the script. Such embodiments may farther identify customer service interaction in which a script should be presented based upon historical trends of a script appearing in previous customer servicer interactions, although there is not an explicit requirement for such script to be included in the customer service interaction.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

We claim:

1. A method of evaluating scripts in an interpersonal communication, the method comprising:
   monitoring a customer service interaction using an audio recording system configured to record audio data from communication between customers and customer service agents in a customer service call center;
   diarizing the customer service interaction by analyzing a single audio file;
   identifying at least one portion of a script in the customer service interaction;
   determining at least one script requirement from the customer service interaction;
   determining if the identified at least one portion of a script meets the at least one script requirement;
   generating an alert indicating that the customer service interaction is non-compliant with an expected script if the identified at least one portion of a script does not meet the at least one script requirement; and
   recognizing common patterns between the customer service interaction and other customer service interactions.

2. The method of claim 1, further comprising:
   compiling a plurality of script models to represent each of a plurality of scripts; and
   comparing the plurality of script models to the audio data to identify the at least one portion of the script in the customer service interaction.

3. The method of claim 1, wherein monitoring the customer service interaction further comprises acquiring customer interaction content data and acquiring customer data.

4. The method of claim 3, further comprising analyzing the acquired customer interaction content data and the acquired customer data to determine the at least one script requirement.

5. The method of claim 1, wherein the at least one script requirement defines at least one script expected to be present in the customer service interaction.

6. The method of claim 4, wherein the at least one script requirement is a rule that defines a positional or temporal relationship between at least one expected script and a portion of the customer service interaction.

7. The method of claim 1, wherein the alert is transmitted to a remote computer for review.

8. The method of claim 1, wherein the alert is presented on a graphical display of a user workstation of a customer service agent who is a party to the customer service interaction.

9. The method of claim 7, wherein the alert includes guidance as to correct an identified non-compliance in the customer service interaction.

10. The method of claim 1, further comprising analyzing the identified at least one script portion to detect an emerging pattern in the customer service interaction.

11. A system for evaluating scripts in an interpersonal communication between a customer service agent and a customer, the system comprising:
- a source of customer interaction content, the customer interaction content comprising customer service interaction data;
- a database comprising a plurality of scripts;
- a processor communicatively connected to the source of customer interaction content and the database comprising a plurality of scripts, the processor receives customer service interaction data and processes the customer service interaction data with the plurality of scripts to identify at least one script portion in the customer service interaction data, the processor diarizes the customer service interaction data by analyzing a single audio file; the processor further processes the customer interaction content to identify at least one script requirement based upon the customer interaction content and compares the identified at least one script portion to the identified at least one script requirement to evaluate a non-compliance of the identified at least one script requirement and (i) produce an alert if a non-compliance is determined and (ii) recognize common patterns between the customer service interaction and other customer service interactions; and
- a graphical display communicatively connected to the processor, wherein the graphical display operates to visually present the alert.

12. The system of claim 11, wherein the customer service interaction data is a transcription of an audible customer service interaction.

13. The system of claim 12, wherein the database comprising a plurality of scripts comprises a plurality of script models, and the processor applies the plurality of script models to the customer service interaction data.

14. The system of claim 11, wherein the alert is a visual guidance to a customer service agent associated with the graphical display and the customer service interaction, wherein the visual guidance includes information to correct the identified non-compliance in the script requirement.

15. A non-transitory computer readable storage medium programmed with computer readable code, the computer readable code, when executed by a computer processor causes the processor to:
- monitor a customer service interaction;
- receive audio data of the customer service interaction;
- transcribe the audio data of the customer service interaction to produce an interaction transcript;
- diarize the customer service interaction by analyzing a single audio file;
- identify at least one portion of a script in the interaction transcript;
- determine at least one script requirement from the monitored customer service interaction;
- determine if the identified at least one portion of a script meets the at least one script requirement;
- generate an alert indicative of a non-compliant customer service interaction if the at least one portion of the script does not meet the at least one script requirement; and
- recognize common patterns between the customer service interaction and other customer service interactions.

16. The non-transitory computer readable storage medium programmed with computer readable code of claim 15, wherein execution of the code by a computer processor further causes the processor to compare at least one script model to the interaction transcript to identify at least one portion of the script in the interaction transcript.

17. The non-transitory computer readable storage medium programmed with computer readable code of claim 15, wherein execution of the code by a computer processor further causes the processor to select the at least one script requirement from a plurality of predetermined script requirements based upon the monitored customer service interaction.

18. The non-transitory computer readable storage medium programmed with computer readable code of claim 17, wherein monitor the customer service interaction further comprises receive customer data and receive interaction data and the processor further selects the at least one script requirement from the customer data and the interaction data.

* * * * *